United States Patent
Needham et al.

[15] 3,637,971
[45] Jan. 25, 1972

[54] FLASH WELDING PROCESSES

[72] Inventors: James C. Needham, Saffron Walden; Keith I. Johnson; John A. Wright, both of Cambridge, all of England

[73] Assignee: The Welding Institute, Cambridge, England

[22] Filed: June 8, 1970

[21] Appl. No.: 44,170

[30] Foreign Application Priority Data

June 10, 1969 Great Britain......................29,403/69

[52] U.S. Cl..............................219/97, 219/101, 219/131, 323/9
[51] Int. Cl. .......................................B23k 9/10, B23k 11/04
[58] Field of Search................219/97, 98, 99, 100, 101, 131; 323/9, 83

[56] References Cited

UNITED STATES PATENTS

| | | | |
|---|---|---|---|
| 3,023,355 | 2/1962 | Thorsén | 323/9 |
| 3,400,239 | 9/1968 | Fahrenbach | 219/97 |
| 3,443,057 | 5/1969 | Allen et al. | 219/131 |
| 3,479,480 | 11/1969 | Erwin et al | 219/97 |
| 3,508,140 | 4/1970 | Moses | 323/81 |

OTHER PUBLICATIONS

American Welding Society; " Welding Handbook" (third edition); 1950, pp. 421– 423.

Primary Examiner—R. F. Staubly
Assistant Examiner—R. O'Neill
Attorney—Kemon, Palmer & Estabrook

[57] ABSTRACT

The invention relates to flash welding processes, and stems from the discovery that craters in the plane of the weld are due to the formation of unexpectedly large arcs. A voltage-limiting circuit is connected across the gap between the two workpieces being welded, and is arranged so that arcing at voltages above a predetermined level is suppressed, but arcing at lower voltages is permitted.

2 Claims, 2 Drawing Figures

FLASH WELDING PROCESSES

Flash welding is a development of resistance butt welding in which heat is generated by passing an electric current through the workpieces to be joined. One workpiece is usually gripped in a fixed clamp and the other in a movable clamp so that the two workpieces may be brought together to complete the secondary circuit of an AC transformer. Current then flows through the initial point of contact to form a molten bridge. As the current through the bridge increases, the increasingly high temperature and the electromagnetic pinch effect combine to rupture the bridge and much of the metal contained in the bridge is expelled violently in a spectacular manner called "flashing." During this time the movable workpiece is being advanced toward the stationary workpiece and a fresh contact is then made elsewhere between the facing surfaces to that the cycle of events can be repeated. Flashing is allowed to continue until the surfaces to be joined are uniformly heated or molten, and by this time the gap between the surfaces will be small. The two workpieces are then rapidly forged together to produce the final weld. The molten metal expelled forms a ragged fin or flash round the joint.

Arcing would not normally be expected at the low voltages used in flash welding. For example, a typical voltage on the open circuited transformer is 6 v. r.m.s. (9 v. peak) which, in itself, is insufficient to sustain an arc at all. However, each molten bridge causes a short circuit current to be drawn which may amount to some hundreds or thousands of amperes. Although the main power circuit is made as noninductive as possible, there is always some remnant inductance amounting typically to some tens of $\mu H$ which means that the short circuit current cannot instantaneously fall to zero as each molten bridge ruptures. The resulting voltage surge due to the collapse of the electric field at rupture is therefore sufficient to initiate an arc, which burns typically at some 20–30 v., although the open circuit voltage cannot sustain it and it is rapidly extinguished.

One of the problems which has existed since this process was first introduced is that of "flat spots" in the plane of the weld. These comprise deep empty craters which are not filled with molten metal or closed during the forging process. Our invention stems from the discovery that these craters are due to the formation of unexpectedly large arcs which persist for much longer than the short-lived arc. We have found that, on occasions, a series of molten bridges are formed, leading to a greater than average buildup in current. The rupturing of the bridges then takes place in an unzipping manner such that the last bridge is subject to the sum total of current and leads to an unexpectedly severe arc.

According to the present invention, the presence of "flat spots" in a flash welding process is substantially eliminated by connecting a high current voltage limiting circuit across the gap between the workpiece, the circuit parameters being so chosen that the short-lived arcs may still be formed, but the growth of larger, more persistent, arcs is suppressed.

At the very high current levels (kiloamps) involved in flash welding processes, a voltage limiting circuit consisting simply of a capacitor connected across the gap between the workpieces would require a very high capacitance (of the order of farads) and such circuits are therefore, in general, not practical. In a preferred embodiment of the invention the voltage limiting circuit therefore includes a reverse biased diode which is biased into conduction when the voltage across the gap reaches a predetermined level. The diode is conveniently connected in series with an accumulator across the gap. A capacitor of the order of 30,000 to 100,000 $\mu F$ can be added in parallel to aid the high transient frequency response of the diode accumulator circuit. The accumulator voltage may be chosen to exceed the supply voltage by a small amount such that any further increase of voltage across the gap forward biases the diode and allows current to flow into the accumulator. Alternatively, the accumulator voltage may be just less than the supply voltage peak, but large enough to prevent excessive charging current flowing through the rectifier.

One example of the invention will now be described with reference to the accompanying drawings in which.

Figure 1:
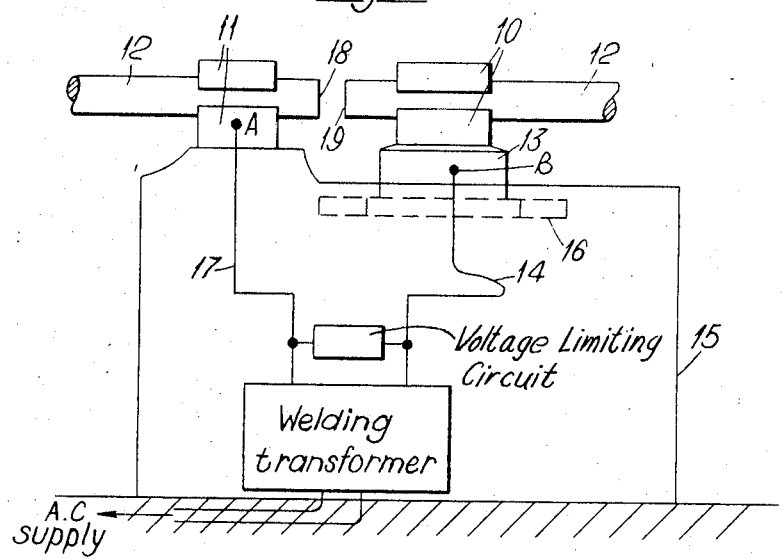
FIG. 1 is a diagrammatic illustration of a flash welding apparatus.

Referring first to FIG. 1, two metal weld members 12 are held in a fixed clamp 11 and a movable clamp 10 respectively. The clamps are mounted on a frame 15 and the movable clamp 10 is connected to a platen 13 which can be driven from end to end along a track 16.

A heavy-duty single-phase AC transformer with a single-turn secondary has a fixed lead 17 connected at A to the fixed clamp and a flexible lead 14 connected at B to the movable platen.

In operation the weld members 12 are flash welded together by advancing the movable platen to the left at a controlled rate until the two facing surfaces 18 and 19 contact one another. A molten bridge is formed at the initial point of contact which subsequently ruptures. The inductance in the secondary circuit of the welding transformer produces a voltage surge as the molten bridge ruptures and this is sufficient to initiate an arc. The magnitude of the voltage surge is, however, limited by a voltage limiting circuit connected across the output of the transformer. Thus, severe arcing leading to very large craters in the surfaces being joined is curtailed. The voltage limiting circuit therefore substantially eliminates the "flat spots" previously found in welds produced by the flash welding process.

Figure 2:
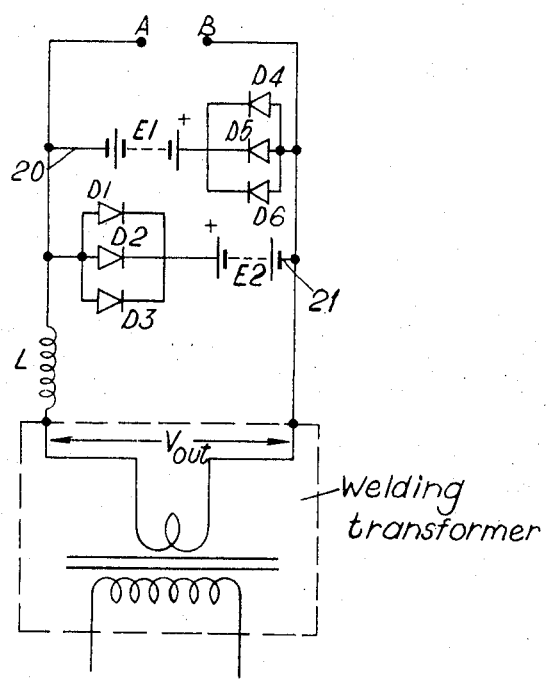
FIG. 2 is a circuit diagram of the voltage limiting circuit shown in FIG. 1.

The voltage limiting circuit is shown in more detail in FIG. 2. The self-inductance of the leads from the welding transformer to the points A and B is shown as an inductance L. The purpose of the voltage limiting circuit is to prevent voltages much greater than the output voltage $V_{out}$ appearing across AB. It also prevents the more persistent type of arc which might be formed if a voltage slightly larger than $V_{out}$ induced by the collapse of the electric field around the inductance was allowed to persist for any length of time. The accumulator E1 and the diodes D4, D5 and D6 act for one half cycle of the output waveform, and the accumulator E2 and the diodes D1, D2 and D3 act on the other half cycle. The voltages of E1 and E2 are so chosen that the paths 20 and 21 are only just conductive at peak open-circuit voltages. For example, the voltage of E1 and E2 may be 10 v. if the output from the transformer is 6 v. r.m.s. Thus, the diodes D4, D5, D6 are normally reverse biased by B1, but will conduct current when the voltage across AB exceeds that of E1 and, similarly diodes D1, D2, D3 conduct when the voltage across AB exceeds E2.

The diodes are preferably silicon diodes capable of carrying a total current of 1,000 amps. between them. A plurality of diodes in parallel is preferred to a single diode of high current capacity to improve the response time of the voltage limiting circuit.

We claim:

1. Flash welding apparatus, comprising:
   a. a first clamp for holding a first weld member;
   b. a second clamp for holding a second weld member a fixed distance from said first member;
   c. means for relatively moving said two clamps to progressively reduce the gap between opposing surfaces of said weld members;
   d. a power supply for applying a voltage across said gap; and
   e. a voltage limiting device connected across, and positioned closely adjacent, said gap, said device limiting the induced arc voltage when said power supply is intermittently short-circuited by the formation and rupture of molten bridges across the gap at the initial points of contact of said members.

2. Apparatus according to claim 1 in which said power supply includes a welding transformer and in which said voltage limiting device includes a first path operative whenever the arc voltage exceeds a predetermined level during one half cycle of the transformer output and a second path operative whenever the voltage exceeds the said level during the opposite half cycle.

* * * * *